US012759414B2

(12) United States Patent
Yamazaki et al.

(10) Patent No.: US 12,759,414 B2
(45) Date of Patent: Oct. 13, 2026

(54) VEHICLE TRACTION CONTROL SYSTEM

(71) Applicant: HONDA MOTOR CO., LTD., Tokyo (JP)

(72) Inventors: Shotaro Yamazaki, Tokyo (JP); Daisuke Yamazaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 97 days.

(21) Appl. No.: 18/783,493

(22) Filed: Jul. 25, 2024

(65) Prior Publication Data

US 2025/0042260 A1 Feb. 6, 2025

(30) Foreign Application Priority Data

Aug. 2, 2023 (JP) ................................ 2023-126424

(51) Int. Cl.
*B60L 15/20* (2006.01)
*B60L 3/10* (2006.01)

(52) U.S. Cl.
CPC ............... *B60L 15/20* (2013.01); *B60L 3/106* (2013.01); *B60L 2240/12* (2013.01); *B60L 2240/465* (2013.01)

(58) Field of Classification Search
None
See application file for complete search history.

(56) References Cited

U.S. PATENT DOCUMENTS 10,391,884 B2 * 8/2019 Iwahana ................ B60L 15/20
11,161,418 B2 * 11/2021 Yamane ................. B60L 3/102
2020/0247244 A1 8/2020 Yamane et al.

FOREIGN PATENT DOCUMENTS

JP H11-105688 4/1999
JP 2006-115644 4/2006
JP 2017-158337 9/2017
JP 2020-127281 8/2020

OTHER PUBLICATIONS

Japanese Office Action for Japanese Patent Application No. 2023-126424 mailed Jun. 3, 2025.

* cited by examiner

*Primary Examiner* — Todd Melton
(74) *Attorney, Agent, or Firm* — Amin, Turocy & Watson, LLP

(57) ABSTRACT

A vehicle control system includes a traction control unit, a front motor control unit, and a rear motor control unit. The traction control unit controls traction of each of a plurality of wheels. Each motor control unit controls a corresponding one of a plurality of rotating electric machines that transmit or receive torque to and from the plurality of wheels on the basis of axle speed information received from the traction control unit. The traction control unit sets a threshold axle speed for determining whether it is necessary to perform predetermined torque control, which is performed by each motor control unit to eliminate a slip of each wheel, between a target axle speed and a vehicle speed and output axle speed information regarding the threshold axle speed to each motor control unit.

6 Claims, 6 Drawing Sheets

VEHICLE TRACTION CONTROL SYSTEM

CROSS-REFERENCE TO RELATED APPLICATION

Priority is claimed on Japanese Patent Application No. 2023-126424, filed Aug. 2, 2023, the content of which is incorporated herein by reference.

BACKGROUND OF THE INVENTION

Field of the Invention

The present invention relates to a vehicle control system.

Description of Related Art

Efforts to provide access to sustainable transportation systems that take into account vulnerable people such as the elderly, people with disabilities, and children among transportation participants have increased in recent years. To achieve this goal, attention has focused on research and development to further improve traffic safety and convenience through development of vehicle behavior stability.

A traction control device that, when eliminating a slip of driving wheels of a vehicle by reducing the torque of a motor which is a power source upon occurrence of the slip at the driving wheels, prevents fluctuations in the wheel speed of the driving wheels and fluctuations in the acceleration in a longitudinal direction of the vehicle by using a slip rate only for an area where the cornering power of the driving wheels is high is known in the related art (for example, see Patent Document 1 below).

[Patent Document 1] Japanese Unexamined Patent Application, First Publication No. 2006-115644

SUMMARY OF THE INVENTION

However, regarding vehicle behavior stability, it is a challenge to, when a slip of wheels has occurred during acceleration or deceleration, eliminate the slip while preventing a decrease in the acceleration or deceleration and instability of vehicle behavior.

For example, the traction control device of the related art described above does not disclose a threshold slip rate used to cancel execution of the traction control and may not be able to stop the traction control promptly when the slip has been eliminated. For example, when the slip has been rapidly eliminated due to a change in road surface friction such as a change from snow to asphalt when the vehicle accelerates, it may not be possible to achieve appropriate acceleration due to delays in the responsiveness in stopping the traction control.

Aspects of the present invention have been made in view of such circumstances and it is an object of the aspects of the present invention to provide a vehicle control system capable of appropriately eliminating slips while preventing a decrease in the acceleration or deceleration and instability of vehicle behavior and thus to contribute to the development of sustainable transportation systems.

The present invention adopts the following aspects to solve the above problems and achieve the object.

(1) A vehicle control system according to an aspect of the present invention includes a traction control unit configured to control traction of a driving wheel and a rotating electric machine control unit configured to control an operation of a rotating electric machine configured to transmit and receive torque to and from the driving wheel on a basis of information received from the traction control unit, wherein the traction control unit is configured to set a threshold axle speed for determining an end of execution of predetermined torque control, which is performed by the rotating electric machine control unit to eliminate a slip of the driving wheel, between a target axle speed and a vehicle speed and output information regarding the threshold axle speed to the rotating electric machine control unit.

(2) In the above aspect (1), the traction control unit may be configured to set the threshold axle speed for during acceleration to a larger of a value obtained by subtracting a first predetermined value from the target axle speed and a predetermined lower threshold value and set the threshold axle speed for during deceleration to a smaller of a value obtained by adding a second predetermined value to the target axle speed and a predetermined upper threshold value.

(3) In the above aspect (2), the rotating electric machine control unit may be configured to set the threshold axle speed for during acceleration to be equal to the target axle speed for during acceleration when the target axle speed for during acceleration is smaller than the predetermined lower threshold value and set the threshold axle speed for during deceleration to be equal to the target axle speed for during deceleration when the target axle speed for during deceleration is greater than the predetermined upper threshold value.

(4) In the above aspect (2) or (3), the traction control unit may be configured to set the predetermined lower threshold value and the predetermined upper threshold value on a basis of a vehicle body condition.

According to the above aspect (1), the traction control unit that sets the threshold axle speed between the target axle speed and the vehicle speed is provided, such that the rotating electric machine control unit can quickly end the predetermined torque control when the slip of the driving wheel has been eliminated or has fallen within an allowable level without requiring the vehicle speed for determining the presence or absence of a slip of the driving wheel. For example, execution of the predetermined torque control in which the torque of the driving wheel is reduced can be prevented from continuing for an excessive period of time, such that it is possible to appropriately eliminate the slip of the driving wheel while preventing a decrease in the acceleration or deceleration and instability of vehicle behavior.

In the case of the above aspect (2), a threshold axle speed for determining the end of execution of the predetermined torque control just before the slip of the driving wheel is eliminated or falls within an allowable level can be set for each of during acceleration and during deceleration, such that it is possible to quickly and appropriately end performing the predetermined torque control.

In the case of the above aspect (3), a threshold axle speed for determining whether it is necessary to perform the predetermined torque control in a state where the slip of the driving wheel has been eliminated or has fallen within an allowable level can be set for each of during acceleration and during deceleration, such that it is possible to appropriately start and end performing the predetermined torque control upon occurrence of a slip of the driving wheel.

In the case of the above aspect (4), it is possible to appropriately determine whether the slip of the driving wheel has been eliminated or has fallen within an allowable level according to the vehicle body condition, such that it is possible to appropriately and accurately improve responsiveness in ending performing the predetermined torque control.

DETAILED DESCRIPTION OF THE INVENTION

Hereinafter, a vehicle control system according to an embodiment of the present invention will be described with reference to the accompanying drawings.

Figure 1:
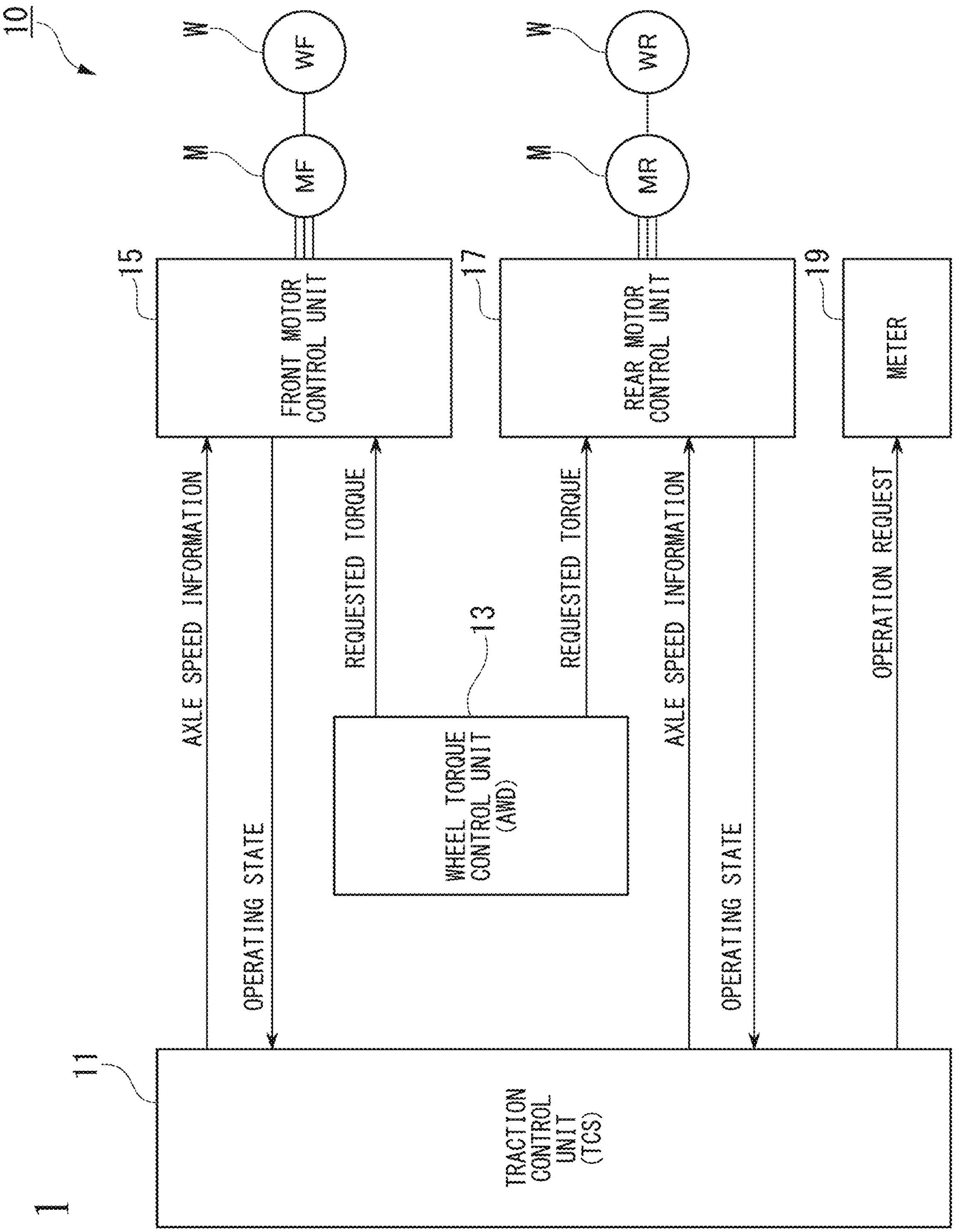
FIG. 1 is a block diagram showing a functional configuration of a vehicle control system in an embodiment of the present invention.

FIG. 1 is a block diagram showing a functional configuration of a vehicle control system 10 in the embodiment.

The vehicle control system 10 of the embodiment is mounted, for example, in an electric vehicle (a vehicle) such as an electric vehicle, a hybrid vehicle, and a fuel cell vehicle. An electric vehicle is driven using a battery as a power source. A hybrid vehicle is driven using a battery and an internal combustion engine as power sources. A fuel cell vehicle is driven using a fuel cell as a power source.

The vehicle control system 10 of the embodiment controls, for example, an electric vehicle provided with a plurality of rotating electric machines M that transmit and receive torque to and from a plurality of wheels W and a notification device that presents various information to a driver. The rotating electric machines M are, for example, three-phase AC brushless DC motors. The rotating electric machines M perform a motoring operation using electric power supplied from a power conversion device or the like to generate driving torques for the wheels W. The rotating electric machines M perform a regenerative operation using rotational power received from the wheels W to generate electric power and generate a braking torque for the wheels W. The rotating electric machines M include, for example, a front motor MF connected to the left and right front wheels WF and a rear motor MR connected to the left and right rear wheels WR.

As shown in FIG. 1, the vehicle control system 10 includes, for example, a traction control unit 11, a wheel torque control unit 13, a front motor control unit 15, a rear motor control unit 17, and a meter 19.

Each of the control units 11, 13, 15, and 17 is a software functional unit that functions by a processor such as a central processing unit (CPU) executing a predetermined program. The software functional unit is an ECU that includes a processor such as a CPU, a read only memory (ROM) that stores programs, a random access memory (RAM) that temporarily stores data, and electronic circuits such as a timer. At least some of the control units 11, 13, 15, and 17 may be an integrated circuit such as a large scale integration (LSI).

Each of the control units 11, 13, 15, and 17 acquires signals of detection values output from various sensors. The various sensors include, for example, an operation amount sensor that detects whether the driver has operated an accelerator operator and a brake operator and their amounts of operation, a current sensor and a voltage sensor that detect the current and voltage of each of the rotating electric machine M, a rotation angle sensor that detects the rotation angle of each of the rotating electric machines M, an acceleration sensor that detects the acceleration of the vehicle, and a wheel speed sensor that detects the rotation speed (a wheel speed) of each wheel W of the vehicle.

The traction control unit 11 constitutes a part of a device such as a so-called traction control system (TCS) that prevents sudden changes in vehicle behavior and stabilizes the attitude of the vehicle. The traction control unit 11 prevents slippage (a slip) of the driving wheels, for example, on a slippery road surface to ensure a desired driving force, braking force, and steering ability.

For example, the traction control unit 11 sets a target axle speed Vw and a threshold axle speed Vth for each of the plurality of rotating electric machines M to control traction of each of the plurality of wheels W. The traction control unit 11 sets a target axle speed Vw and a threshold axle speed Vth for each of the front motor MF that transmits and receives torque to and from the left and right front wheels WF of the vehicle and the rear motor MR that transmits and receives torque to and from the left and right rear wheels WR of the vehicle.

The traction control unit 11 sets the target axle speed Vw and the threshold axle speed Vth, for example, as threshold values for determining whether it is necessary to perform predetermined torque control that is performed by each of the front motor control unit 15 and the rear motor control unit 17 which will be described later. The predetermined torque control is, for example, a process of controlling the torque of each rotating electric machine M to eliminate the slip of wheels W which are driving wheels. For example, the traction control unit 11 sets the target axle speed Vw as an activation threshold value for determining the start of execution of the predetermined torque control and sets the threshold axle speed Vth as a deactivation threshold value for determining the end of execution of the predetermined torque control.

For example, the traction control unit 11 sets the threshold axle speed Vth between the target axle speed Vw and a vehicle speed Vv. For example, the traction control unit 11 acquires signals of detection values output from the acceleration sensor and the wheel speed sensor and acquires the speed of the vehicle (the vehicle speed) Vv through a predetermined calculation, map search, or the like based on the acceleration and wheel speed. The traction control unit 11 sets, for example, a predetermined offset ΔV as information regarding the threshold axle speed Vth. For example, a threshold axle speed Vth for during acceleration of the vehicle is set by subtracting the offset ΔV from the target axle speed Vw (Vth=Vw−ΔV) and a threshold axle speed Vth for during deceleration of the vehicle is set by adding the offset ΔV to the target axle speed Vw (Vth=Vw+ΔV).

The traction control unit 11 transmits, for example, axle speed information including the target axle speed Vw and the predetermined offset ΔV which is information regarding the threshold axle speed Vth to each of the front motor control unit 15 and the rear motor control unit 17 which will be described later. The traction control unit 11 receives, for example, information indicating the operating state of the predetermined torque control transmitted from each of the front motor control unit 15 and the rear motor control unit 17 which will be described later.

For example, the traction control unit 11 acquires the state of the vehicle through a predetermined estimation process or the like on the basis of various information received from the outside such as the information indicating the operating state of the predetermined torque control. For example, the traction control unit 11 instructs the meter 19 which will be described later to notify that the predetermined torque control is in operation or stopped.

The wheel torque control unit 13 controls torque transmission of each wheel W of the vehicle as in so-called all wheel drive (AWD). For example, the wheel torque control unit 13 optimizes torque distribution to the front, rear, left, and right wheels W in various traveling states such as acceleration, deceleration, and turning of the vehicle to ensure desired traveling stability.

For example, the wheel torque control unit 13 controls a torque distributed to each of the plurality of wheels W by setting a requested torque for each of the plurality of rotating electric machines M in accordance with a torque which the driver of the vehicle has requested by performing an accelerator operation, a brake operation, or the like. The wheel torque control unit 13 sets a requested torque for each of the front motor MF and the rear motor MR. The wheel torque control unit 13 transmits information on the requested torque to each of the front motor control unit 15 and the rear motor control unit 17 which will be described later through communication with each of the front motor control unit 15 and the rear motor control unit 17.

Each of the front motor control unit 15 and the rear motor control unit 17 includes, for example, a power conversion device connected to a power source such as a power storage device mounted in the vehicle. Each of the motor control units 15 and 17 controls electric power transfer to and from each of the front motor MF and the rear motor MR, for example, via a power conversion device including a plurality of switching elements or the like. During the motoring operation of the rotating electric machines M (the motors MF and MR), the motor control units 15 and 17 cause current to sequentially flow to three-phase stator windings of the rotating electric machines M to generate a rotational driving force. During the regenerative operation of the rotating electric machines M (the motors MF and MR), the motor control units 15 and 17 convert the three-phase AC power input from the three-phase stator windings into DC power through a switching operation of each phase synchronized with the rotation of the rotating electric machines M.

Each of the motor control units 15 and 17 performs feedback control on the rotation speed and torque of the corresponding rotating electric machine M (a corresponding one of the motors MF and MR) on the basis of the axle speed information received from the traction control unit 11, the requested torque received from the wheel torque control unit 13, and the detection values received from the various sensors.

For example, each of the motor control units 15 and 17 acquires a detection value of the rotational speed of the corresponding rotating electric machine M output from the rotation angle sensor and acquires an axle speed Vs in the speed dimension according to the rotational speed of the corresponding rotating electric machine M. For example, each of the motor control units 15 and 17 calculates a threshold axle speed Vth using the target axle speed Vw and the predetermined offset ΔV acquired from the traction control unit 11. As described above, the threshold axle speed Vth for during acceleration of the vehicle is calculated by subtracting the offset ΔV from the target axle speed Vw (Vth=Vw-ΔV) and the threshold axle speed Vth for during deceleration of the vehicle is calculated by adding the offset ΔV to the target axle speed Vw (Vth=Vw+ΔV).

For example, each of the motor control units 15 and 17 determines whether it is necessary to start performing the predetermined torque control for eliminating the slip of the wheels W which are driving wheels on the basis of a comparison between the axle speed Vs and the target axle speed Vw. For example, each of the motor control units 15 and 17 determines whether it is necessary to end performing the predetermined torque control on the basis of a comparison between the axle speed Vs and the threshold axle speed Vth.

The meter 19 is a part of a notification device mounted in the vehicle. The meter 19 notifies of various information according to command signals or the like received from the control units 11, 13, 15, and 17. For example, the meter 19 notifies of information indicating whether the predetermined torque control of each of the motor control units 15 and 17 is in operation or stopped through an operation such as blinking a lamp.

An example of the operation of the vehicle control system 10 in the embodiment will be described below.

Figure 2:
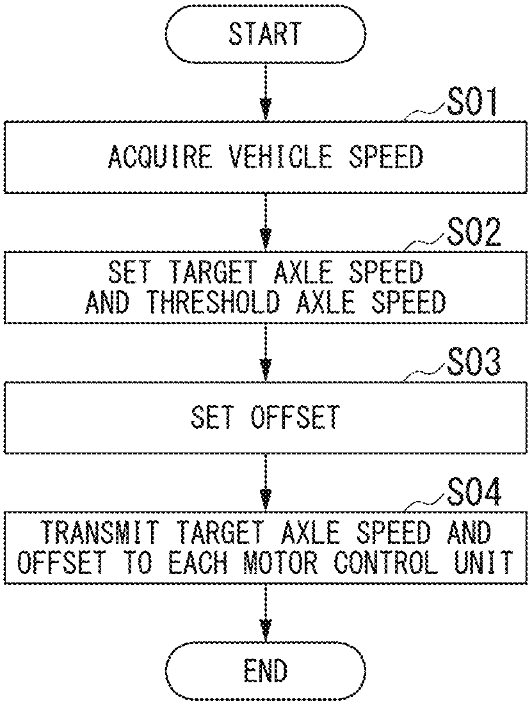
FIG. 2 is a flowchart showing an operation of the vehicle control system in the embodiment of the present invention.

FIG. 2 is a flowchart showing the operation of the traction control unit 11 among the operations of the vehicle control system 10 of the embodiment. For example, the traction control unit 11 repeats a series of processing steps from step S01 to step S04 shown in FIG. 2 at a predetermined cycle.

As shown in FIG. 2, first, the traction control unit 11 acquires, for example, detection values of the acceleration and wheel speed output from the acceleration sensor and the wheel speed sensor and acquires a vehicle speed Vv through a predetermined calculation, map search, or the like based on the acceleration and wheel speed (step S01).

Next, the traction control unit 11 sets a target axle speed Vw and sets a threshold axle speed Vth between the target axle speed Vw and the vehicle speed Vv (step S02).

Next, the traction control unit 11 sets a predetermined offset ΔV according to the threshold axle speed Vth for each of during acceleration and during deceleration of the vehicle (step S03).

Next, the traction control unit 11 transmits axle speed information including the target axle speed Vw and the predetermined offset ΔV to each of the motor control units 15 and 17 (step S04). Then, the traction control unit 11 ends the process.

Examples of the operation of the vehicle control system 10 in the embodiment during vehicle acceleration and during vehicle deceleration will be described below. Examples in which the front motor MF is controlled, for example, in response to a slip occurring at the left and right front wheels WF will be described with reference to FIGS. 3, 4, and 5 shown below.

Figure 3:
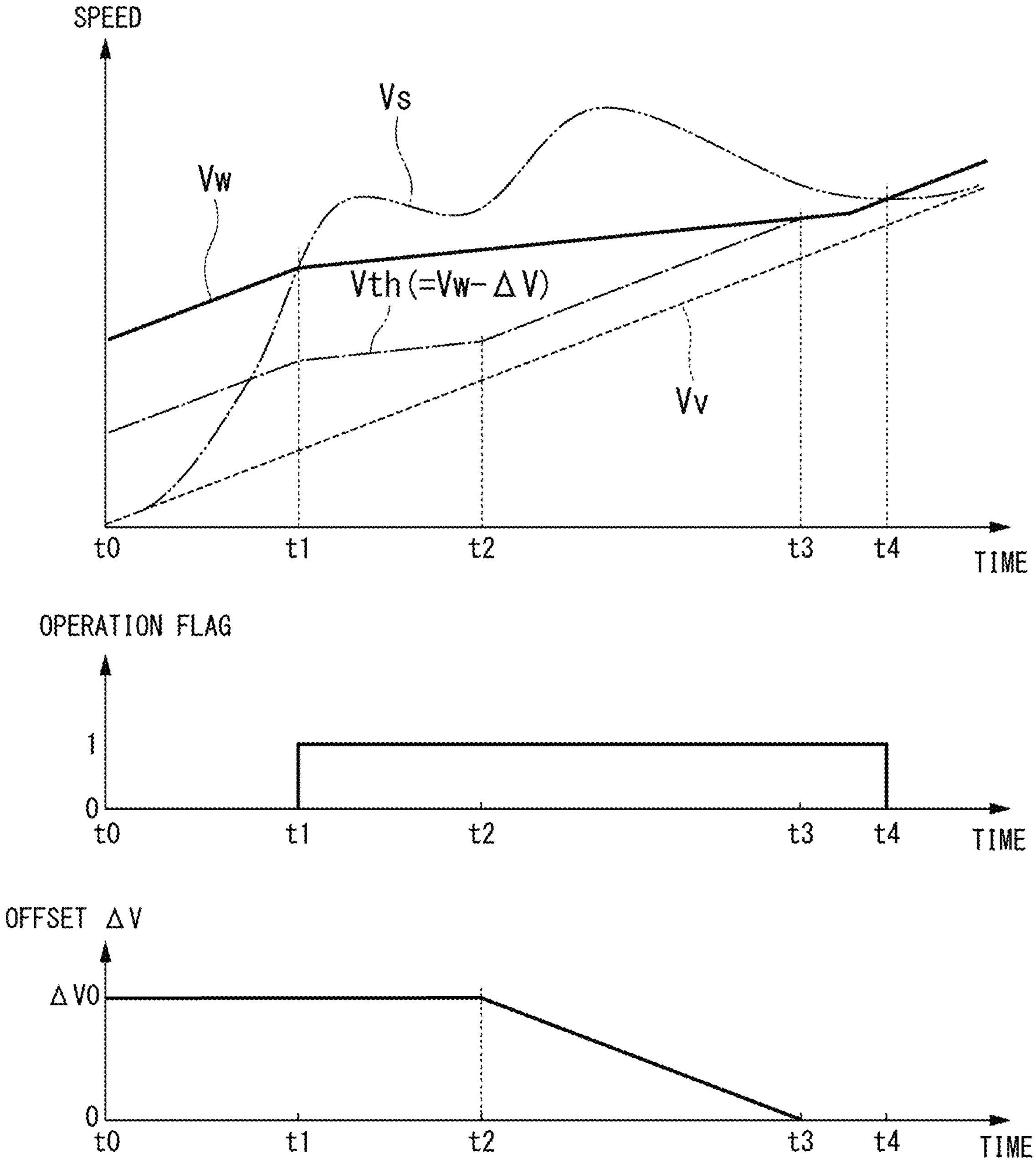
FIG. 3 is a graph showing an example of a correspondence relationship between an axle speed, a target axle speed, a threshold axle speed, a vehicle speed, an operation flag, and an offset during acceleration of a vehicle in the vehicle control system of the 5 embodiment of the present invention.

FIG. 3 is a graph showing an example of a correspondence relationship between the axle speed Vs, the target axle speed Vw, the threshold axle speed Vth, the vehicle speed Vv, an operation flag, and the offset ΔV for during acceleration of the vehicle in the vehicle control system 10 of the embodiment. FIG. 4 is a graph showing an example of a correspondence relationship between the target axle speed Vw, the threshold axle speed Vth, a minimum threshold axle speed VthL, the vehicle speed Vv, and the offset ΔV for during acceleration of the vehicle in the vehicle control system 10 of the embodiment.

Figure 4:
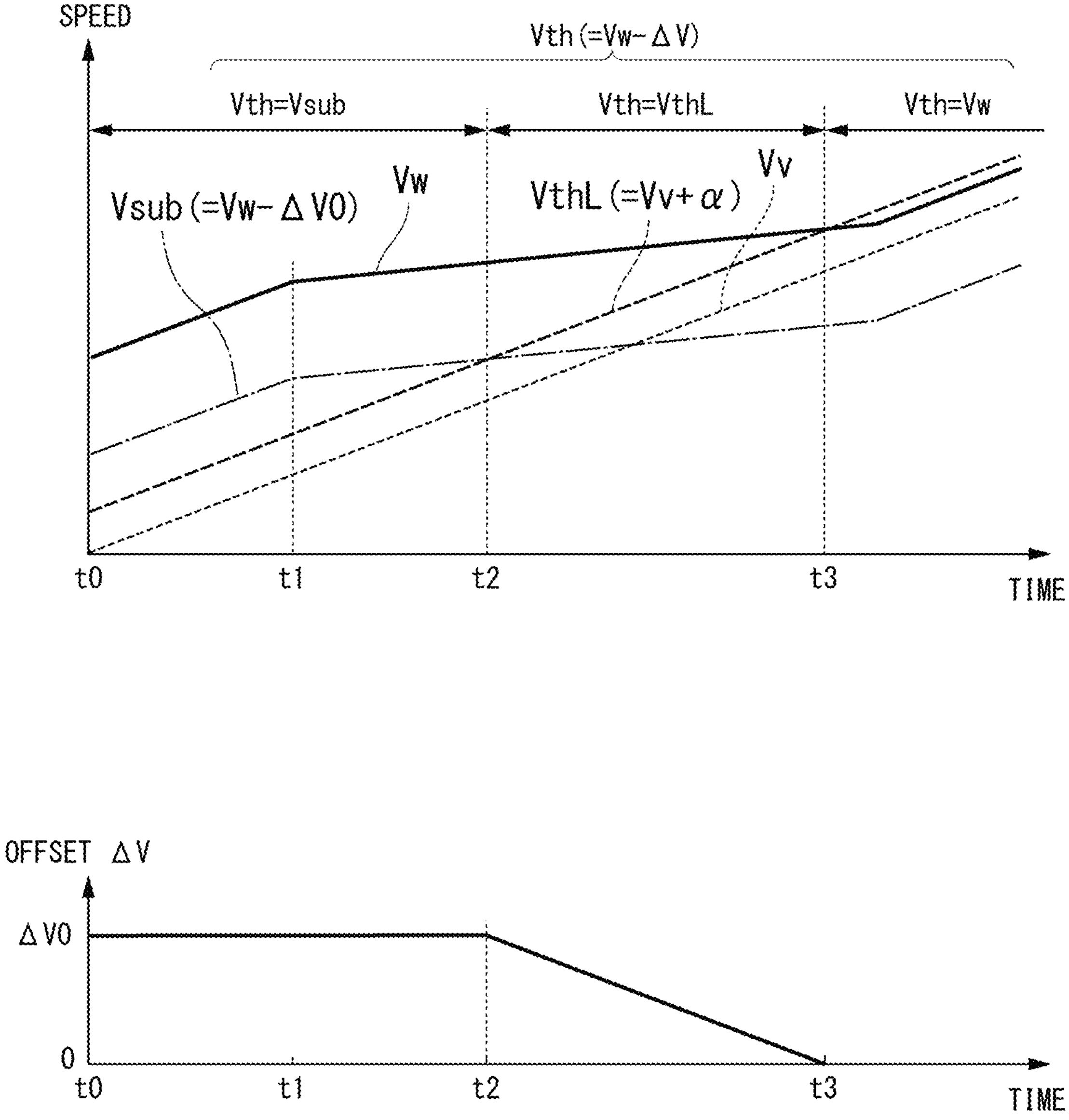
FIG. 4 is a graph showing an example of a correspondence relationship between the target axle speed, the threshold axle speed, a minimum threshold axle speed, and the vehicle speed for during acceleration of the vehicle and an offset in the vehicle control system of the embodiment of the present invention.
Figure 5:
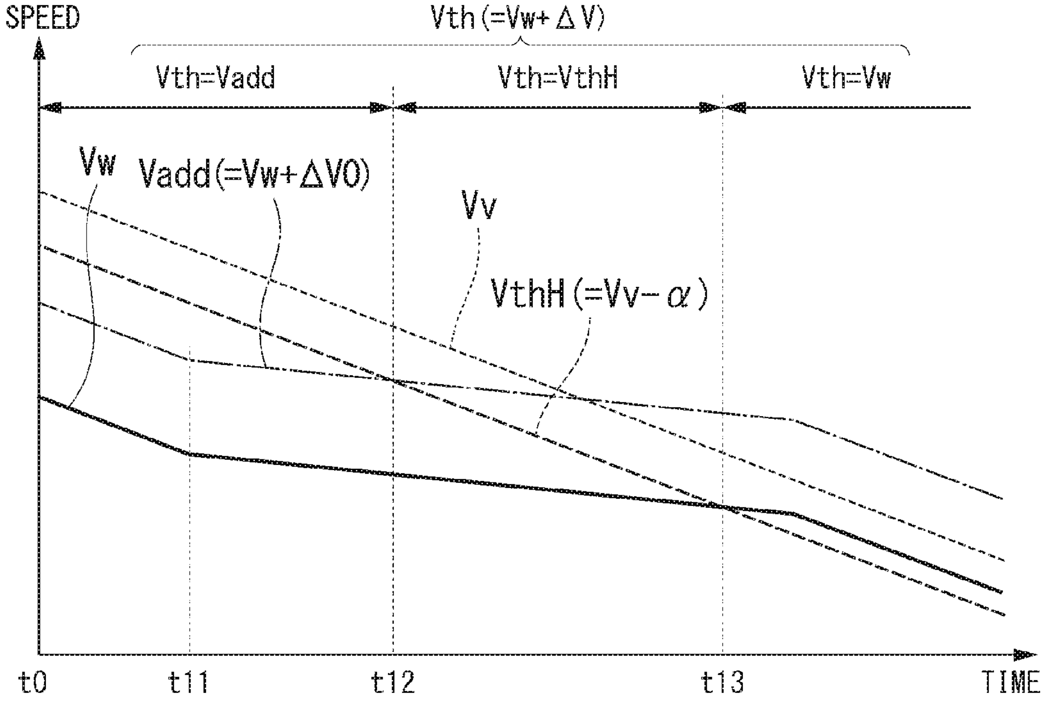
FIG. 5 is a graph showing an example of a correspondence relationship between a target axle speed, a threshold axle speed, a maximum threshold axle speed, and a vehicle speed for during deceleration of the vehicle and the offset in the vehicle control system of the embodiment of the present invention.
Figure 5:
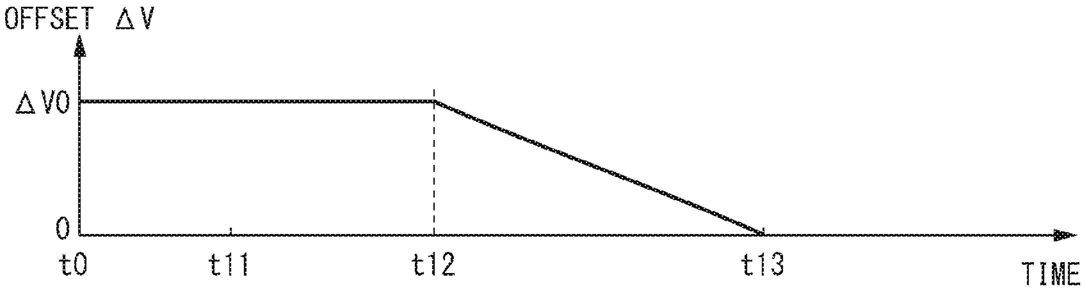

When the vehicle accelerates as shown in FIGS. 3 and 4, the traction control unit 11 sets, for example, the larger of a value (a difference Vsub) obtained by subtracting a first predetermined value from the target axle speed Vw and a predetermined lower threshold value as the threshold axle speed Vth. The traction control unit 11 sets, for example, a predetermined initial value ΔV0 of the offset ΔV as the first predetermined value. The traction control unit 11 sets, for example, a minimum threshold axle speed VthL (=Vv+α) obtained by adding a predetermined value α to the vehicle speed Vv as the predetermined lower threshold value.

The predetermined lower threshold value is, for example, a threshold value for the axle speed Vs for determining that a slip of each wheel W has been eliminated or has fallen within an allowable level during acceleration of the vehicle. For example, the offset ΔV for during acceleration of the vehicle is set such that at least the threshold axle speed Vth does not become less than the predetermined lower threshold value. For example, by setting the minimum threshold axle speed VthL (=Vv+α) as the predetermined lower threshold value, the threshold axle speed Vth is always greater than the vehicle speed Vv even if the target axle speed Vw changes. The predetermined value α is, for example, a value corresponding to the amount of the slip of each wheel W when it has been recognized that the slip of each wheel W has been eliminated or has fallen within an allowable level.

First, for example, as the axle speed Vs increases to or above the vehicle speed Vv from time to, the traction control unit 11 changes the offset ΔV from zero to a predetermined initial value ΔV0.

Next, for example, as the axle speed Vs increases to or above the target axle speed Vw from time t1, the front motor control unit 15 changes the flag value of the operation flag from zero to “1” to set the start of execution of the predetermined torque control for eliminating the slip of the front wheels WF.

The traction control unit 11 sets the difference Vsub (=Vw-ΔV0) as the threshold axle speed Vth, for example, when the difference Vsub (=Vw-ΔV0) is greater than the minimum threshold axle speed VthL (=Vv+α) as in the period from time t0 to time t2.

Next, for example, as the difference Vsub (=Vw-ΔV0) decreases to or below the minimum threshold axle speed VthL (=Vv+α) and the minimum threshold axle speed VthL (=Vv+α) increases toward the target axle speed Vw from time t2, the traction control unit 11 changes the offset ΔV from the predetermined initial value ΔV0 such that it has a decreasing tendency toward zero. The traction control unit 11 sets the minimum threshold axle speed VthL (=Vv+α) as the threshold axle speed Vth.

Next, for example, as the target axle speed Vw decreases to or below the minimum threshold axle speed VthL (=Vv+α) from time t3, the traction control unit 11 sets the offset ΔV to zero. The traction control unit 11 sets the target axle speed Vw as the threshold axle speed Vth.

Next, for example, as the axle speed Vs decreases to or below the threshold axle speed Vth (=target axle speed Vw) from time t4, the front motor control unit 15 sets the flag value of the operation flag from “1” to zero to set the end of execution of the predetermined torque control for eliminating the slip of the front wheels WF.

FIG. 5 is a graph showing an example of a correspondence relationship between the target axle speed Vw, the threshold axle speed Vth, a maximum threshold axle speed VthH, the vehicle speed Vv, and the offset ΔV for during deceleration of the vehicle in the vehicle control system 10 of the embodiment.

When the vehicle decelerates as shown in FIG. 5, the traction control unit 11 sets, for example, the smaller of a value (a sum Vadd) obtained by adding a second predetermined value to the target axle speed Vw and a predetermined upper threshold value as the threshold axle speed Vth. The traction control unit 11 sets, for example, a predetermined initial value ΔV0 of the offset ΔV as the second predetermined value. The traction control unit 11 sets, for example, a maximum threshold axle speed VthH (=Vv−α) obtained by subtracting a predetermined value α from the vehicle speed Vv as the predetermined upper threshold value.

The predetermined upper threshold value is, for example, a threshold value for the axle speed Vs for determining that a slip of each wheel W has been eliminated or has fallen within an allowable level during deceleration of the vehicle. For example, the offset ΔV for during deceleration of the vehicle is set such that at least the threshold axle speed Vth does not become greater than the predetermined upper threshold value. For example, by setting the maximum threshold axle speed VthH (=Vv−α) as the predetermined upper threshold value, the threshold axle speed Vth is always smaller than the vehicle speed Vv even if the target axle speed Vw changes. The predetermined value α is, for example, a value corresponding to the amount of the slip of each wheel W when it has been recognized that the slip of each wheel W has been eliminated or has fallen within an allowable level.

First, for example, as the axle speed Vs (not shown) decreases to or below the vehicle speed Vv from time to, the traction control unit 11 changes the offset ΔV from zero to a predetermined initial value ΔV0.

Next, for example, as the axle speed Vs (not shown) decreases to or below the target axle speed Vw from time t11, the front motor control unit 15 changes the flag value of the operation flag (not shown) from zero to “1” to set the start of execution of the predetermined torque control for eliminating the slip of the front wheels WF.

The traction control unit 11 sets the sum Vadd (=Vw+ΔV0) as the threshold axle speed Vth, for example, when the sum Vadd (=Vw+ΔV0) is smaller than the maximum threshold axle speed VthH (=Vv−α) as in the period from time t0 to time t12. Next, for example, as the sum Vadd (=Vw+ΔV0) increases to or above the maximum threshold axle speed VthH (=Vv−α) and the maximum threshold axle speed VthH (=Vv−α) decreases toward the target axle speed Vw from time t12, the traction control unit 11 changes the offset ΔV from the predetermined initial value ΔV0 such that it has a decreasing tendency toward zero. The traction control unit 11 sets the maximum threshold axle speed VthH (=Vv−α) as the threshold axle speed Vth.

Next, for example, as the target axle speed Vw increases to or above the maximum threshold axle speed VthH (=Vv−α) from time t13, the traction control unit 11 sets the offset ΔV to zero. The traction control unit 11 sets the target axle speed Vw as the threshold axle speed Vth.

Then, for example, as the axle speed Vs (not shown) increases to or above the threshold axle speed Vth (=target axle speed Vw), the front motor control unit 15 sets the flag value of the operation flag (not shown) from "1" to zero to set the end of execution of the predetermined torque control for eliminating the slip of the front wheels WF.

In the examples shown in FIGS. 3, 4, and 5 described above, the traction control unit 11 sets the predetermined value α for setting each of the minimum threshold axle speed VthL (=Vv+α) and the maximum threshold axle speed VthH (=Vv−α) as a fixed value or a variable value that changes depending on a vehicle body condition or the like. The vehicle body condition is, for example, the dynamic radius and the amount of slip of the tire of each wheel W.

Figure 6:
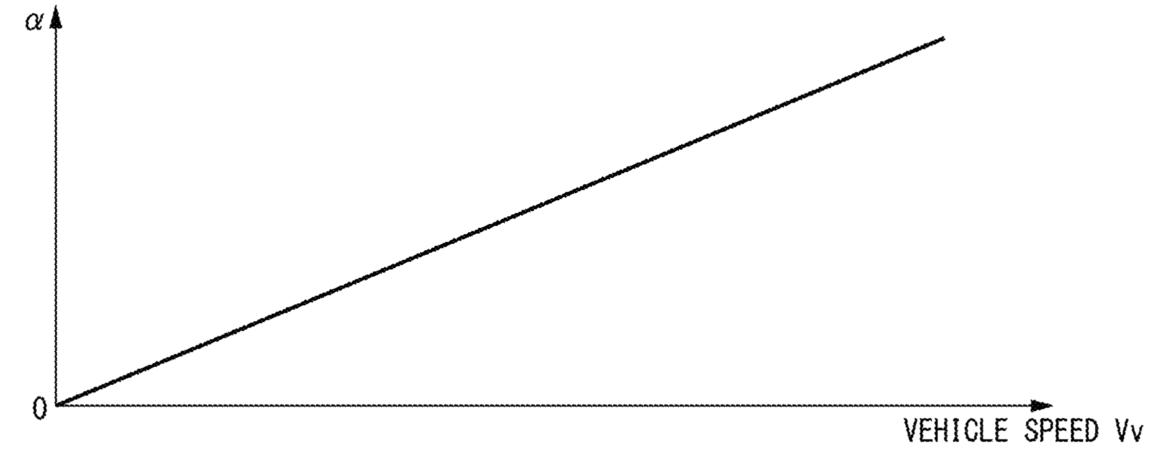
FIG. 6 is a graph showing an example of a correspondence relationship between a predetermined value and a vehicle speed in the vehicle control system of the embodiment of the present invention.
Figure 7:
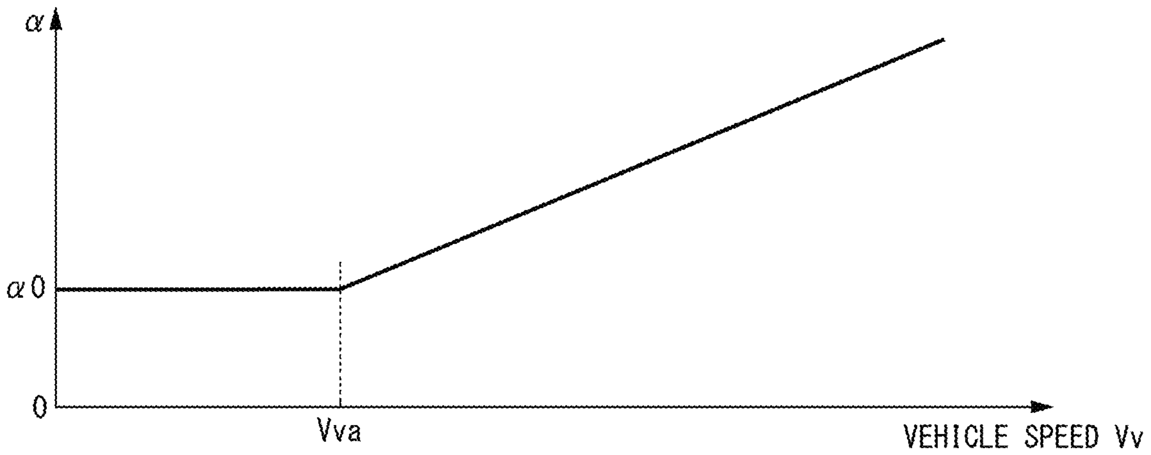
FIG. 7 is a graph showing another example of a correspondence relationship between a predetermined value and a vehicle speed in the vehicle control system of the embodiment of the present invention.

FIG. 6 is a graph showing an example of a correspondence relationship between the predetermined value α and the vehicle speed Vv in the vehicle control system 10 of the embodiment. FIG. 7 is a graph showing another example of a correspondence relationship between the predetermined value α and the vehicle speed Vv in the vehicle control system 10 of the embodiment.

For example, when the predetermined value α is a variable value, the traction control unit 11 changes the predetermined value α according to the vehicle speed Vv as shown in FIGS. 6 and 7.

For example, the predetermined value α shown in FIG. 6 corresponds to the case where each of the threshold axle speeds VthL and VthH is set according to a slip rate and changes with an increasing tendency from zero as the vehicle speed Vv increases from zero.

For example, the predetermined value α shown in FIG. 7 corresponds to the case where each of the threshold axle speeds VthL and VthH is set according to the amount of slip in a low vehicle speed region and set according to the slip rate in a high vehicle speed region. The predetermined value α shown in FIG. 7 is a predetermined constant value α0 when the vehicle speed Vv is less than or equal to a predetermined threshold value Vva and changes with an increasing tendency from the predetermined constant value α0 as the vehicle speed Vv increases from the predetermined threshold value Vva.

The vehicle control system 10 of the embodiment includes the traction control unit 11 that sets the threshold axle speed Vth between the target axle speed Vw and the vehicle speed Vv as described above, such that each of the motor control units 15 and 17 can quickly end the predetermined torque control when the slip of each wheel W has been eliminated or has fallen within an allowable level without requiring the vehicle speed Vv for determining the presence or absence of a slip of each wheel W. For example, execution of the predetermined torque control in which the torque of each wheel W is reduced can be prevented from continuing for an excessive period of time, such that it is possible to appropriately eliminate the slip of each wheel W while preventing a decrease in the acceleration or deceleration and instability of vehicle behavior.

A threshold axle speed Vth for determining the end of execution of the predetermined torque control just before the slip of each wheel W is eliminated or falls within an allowable level can be set on the basis of the difference Vsub, the sum Vadd, the minimum threshold axle speed VthL, and the maximum threshold axle speed VthH for each of during acceleration and during deceleration, such that it is possible to quickly and appropriately end performing the predetermined torque control.

A threshold axle speed Vth for determining whether it is necessary to perform the predetermined torque control in a state where the slip of each wheel W has been eliminated or has fallen within an allowable level can be set on the basis of the target axle speed Vw, the minimum threshold axle speed VthL, and the maximum threshold axle speed VthH for each of during acceleration and during deceleration, such that it is possible to appropriately start and end performing the predetermined torque control upon occurrence of a slip of each wheel W.

By setting the predetermined value α as a variable value, the traction control unit 11 can appropriately determine whether the slip of each wheel W has been eliminated or has fallen within an allowable level according to the vehicle body condition, such that it is possible to appropriately and accurately improve responsiveness in ending performing the predetermined torque control.

The traction control unit 11 configures the axle speed information to be transmitted to each of the motor control units 15 and 17 using the target axle speed Vw and the offset ΔV, such that it is possible to prevent an increase in the amount of communication, for example, compared to when the axle speed information is configured using the threshold axle speed Vth instead of the offset ΔV.

Modifications

Hereinafter, modifications of the embodiment will be described. The same parts as those in the embodiment described above are given the same reference numerals and description thereof will be omitted or simplified.

In the embodiment described above, the traction control unit 11 sets the first predetermined value for obtaining the difference Vsub for during acceleration of the vehicle and the second predetermined value for obtaining the sum Vadd for during deceleration of the vehicle to the same predetermined initial value ΔV0, but the present invention is not limited thereto and the first predetermined value and the second predetermined value may be set to different values.

In the embodiment described above, the traction control unit 11 sets the maximum threshold axle speed VthH for during acceleration of the vehicle and the minimum threshold axle speed VthL for during deceleration of the vehicle using the same predetermined value α, but the present invention is not limited thereto and the maximum threshold axle speed VthH and the minimum threshold axle speed VthL may be set using different values instead of the same predetermined value α.

In the embodiment described above, examples in which the front motor MF is controlled in response to a slip occurring at the left and right front wheels WF have been described with reference to FIGS. 3, 4, and 5, but the present invention is not limited thereto and a similar process may be performed, for example, when the rear motor MR is controlled in response to a slip occurring at the left and right rear wheels WR.

In the embodiment described above, the vehicle includes the front motor MF connected to the left and right front wheels WF and the rear motor MR connected to the left and right rear wheels WR, but the present invention is not limited thereto. For example, each wheel W may be individually provided with a rotating electric machine M or each appropriate combination of wheels W may be individually provided with a rotating electric machine M.

Although embodiments of the present invention have been described, these embodiments have been presented by way of example and are not intended to limit the scope of the invention. These embodiments can be implemented in various other forms, and various omissions, substitutions, and changes can be made without departing from the spirit of the invention. These embodiments and modifications thereof are included in the scope or spirit of the invention as well as in the scope of the invention described in the claims and their equivalents.

What is claimed is:

1. A vehicle control system comprising:

a processor configured to:

control traction of a driving wheel when a target axle speed is detected; and control an operation of a rotating electric machine configured to transmit and receive torque to and from the driving wheel on a basis of information received from the driving wheel, wherein the driving wheel is configured to set a threshold axle speed for determining an end of execution of predetermined torque control, which is performed to eliminate a slip of the driving wheel, between the target axle speed and a vehicle speed and output information regarding the threshold axle speed to the processor, and wherein the processor is configured to set the threshold axle speed during acceleration to a greater one of a value obtained by subtracting a first predetermined value from the target axle speed and a predetermined lower threshold value.

2. A vehicle control system comprising:

a processor configured to:

control traction of a driving wheel when a target axle speed is detected; and control an operation of a rotating electric machine configured to transmit and receive torque to and from the driving wheel on a basis of information received from the driving wheel, wherein the driving wheel is configured to set a threshold axle speed for determining an end of execution of predetermined torque control, which is performed to eliminate a slip of the driving wheel, between the target axle speed and a vehicle speed and output information regarding the threshold axle speed to the processor, and wherein the processor is configured to set the threshold axle speed during deceleration to lesser one of a value obtained by adding a first predetermined value to the target axle speed and a predetermined upper threshold value.

3. The vehicle control system according to claim 1, wherein the processor is configured to set the threshold axle speed during acceleration to be equal to the target axle speed during acceleration when the target axle speed during acceleration is less than the predetermined lower threshold value.

4. The vehicle control system according to claim 3, wherein the processor is configured to set the threshold axle speed during deceleration to be equal to the target axle speed during deceleration when the target axle speed during deceleration is greater than the predetermined upper threshold value.

5. The vehicle control system according to claim 3, wherein the processor is configured to set the predetermined lower threshold value to a value obtained by adding a second predetermined value to the vehicle speed.

6. The vehicle control system according to claim 3, wherein the processor is configured to set the predetermined upper threshold value to a value obtained by subtracting a second predetermined value from the vehicle speed.

* * * * *